(12) United States Patent
Pun

(10) Patent No.: US 10,759,911 B2
(45) Date of Patent: Sep. 1, 2020

(54) THERMOPLASTIC STARCH COMPOSITION DERIVATIVES FROM AGRICULTURAL BYPRODUCTS

(71) Applicant: TEXCHEM POLYMERS SDN BHD, Penang (MY)

(72) Inventor: Meng Yan Pun, Penang (MY)

(73) Assignee: TEXCHEM POLYMERS SDN BHD, Penang (MY)

( * ) Notice: Subject to any disclaimer, the term of this patent is extended or adjusted under 35 U.S.C. 154(b) by 0 days.

(21) Appl. No.: 16/239,261

(22) Filed: Jan. 3, 2019

(65) Prior Publication Data

US 2019/0375900 A1 Dec. 12, 2019

Related U.S. Application Data

(60) Continuation of application No. 15/980,343, filed on May 15, 2018, now Pat. No. 10,196,490, which is a division of application No. 15/493,991, filed on Apr. 21, 2017, now Pat. No. 9,988,503, which is a division of application No. 15/080,151, filed on Mar. 24, 2016, now Pat. No. 9,650,475, which is a continuation of application No. 14/371,982, filed as application No. PCT/MY2012/000278 on Nov. 21, 2012, now Pat. No. 9,328,223.

(30) Foreign Application Priority Data

Mar. 13, 2012 (MY) .......................... PI20127000072

(51) Int. Cl.
*C08J 3/00* (2006.01)
*C08J 3/22* (2006.01)
*C08L 3/00* (2006.01)
*C08L 3/02* (2006.01)
*C08L 25/04* (2006.01)
*C08L 99/00* (2006.01)
*C08K 5/098* (2006.01)
*C08K 5/13* (2006.01)
*C08L 29/04* (2006.01)
*C08L 97/00* (2006.01)
*C08L 23/10* (2006.01)
*C08L 23/12* (2006.01)
*C08L 23/30* (2006.01)
*C08L 25/06* (2006.01)
*C08L 51/00* (2006.01)
*C08L 51/06* (2006.01)
*B29B 7/90* (2006.01)
*B29B 7/00* (2006.01)
*B29B 7/46* (2006.01)
*B29C 48/40* (2019.01)

(52) U.S. Cl.
CPC .................. *C08J 3/22* (2013.01); *B29B 7/007* (2013.01); *B29B 7/46* (2013.01); *B29B 7/90* (2013.01); *B29C 48/40* (2019.02); *C08J 3/005* (2013.01); *C08K 5/098* (2013.01); *C08K 5/13* (2013.01); *C08L 3/00* (2013.01); *C08L 3/02* (2013.01); *C08L 23/10* (2013.01); *C08L 23/12* (2013.01); *C08L 23/30* (2013.01); *C08L 25/04* (2013.01); *C08L 25/06* (2013.01); *C08L 29/04* (2013.01); *C08L 51/003* (2013.01); *C08L 51/06* (2013.01); *C08L 97/00* (2013.01); *C08L 99/00* (2013.01); *C08J 2303/02* (2013.01); *C08J 2423/06* (2013.01); *C08J 2423/12* (2013.01); *C08J 2425/06* (2013.01); *C08J 2451/00* (2013.01); *C08L 2205/03* (2013.01); *C08L 2205/035* (2013.01); *C08L 2207/04* (2013.01)

(58) Field of Classification Search
CPC .... C08L 3/00; C08L 3/02; C08L 25/04; C08L 29/04; C08L 97/00; C08L 99/00; C08L 2205/03; C08L 2205/035; C08L 2207/04; C08J 3/22; C08J 3/005; C08J 2423/06; C08J 2423/12; C08J 2425/06; C08J 2451/00

See application file for complete search history.

(56) References Cited

U.S. PATENT DOCUMENTS

| | | |
|---|---|---|
| 6,231,970 B1 | 5/2001 | Anderson |
| 6,844,380 B2 | 1/2005 | Favis |
| 2006/0006606 A1 | 1/2006 | Boswell et al. |

(Continued)

FOREIGN PATENT DOCUMENTS

| | | | |
|---|---|---|---|
| EP | 0 032 802 B1 * | 4/1985 | ............... C08J 5/00 |
| EP | 0032802 | 4/1985 | |

(Continued)

OTHER PUBLICATIONS

Extended European Search Report issued in European Application No. EP 18150644.5 dated Jun. 6, 2018, 8 pages.

(Continued)

*Primary Examiner* — Robert D Harlan

(57) ABSTRACT

A thermoplastic starch composition acquired from compounding a mixture comprises starch-containing agricultural waste in 45 to 70% by weight of total composition that the agricultural waste contains starch content less than 50% in dry weight; thermoplastic synthetic polymer in 25 to 50% by weight of total composition; plasticizer in 1 to 10% by weight of total composition; and coupling agent in 1 to 5% by weight of total composition; wherein the compounding is performed at a first temperature which is higher than room temperature.

16 Claims, 3 Drawing Sheets

(56) References Cited

U.S. PATENT DOCUMENTS

| | | | |
|---|---|---|---|
| 2008/0203606 A1* | 8/2008 | Xu | C08L 3/00 264/140 |
| 2010/0305271 A1 | 12/2010 | Mentink et al. | |
| 2010/0311874 A1 | 12/2010 | Mentink | |

FOREIGN PATENT DOCUMENTS

| | | |
|---|---|---|
| EP | 0758669 B1 | 2/1997 |
| EP | 2756034 | 7/2014 |
| FR | 2732687 A1 | 10/1999 |
| GB | 2272700 A | 5/1994 |
| JP | 59-135142 | 8/1984 |
| JP | 5-60502 | 9/1993 |
| JP | H11-138622 | 5/1999 |
| JP | 2002-186948 | 7/2002 |
| JP | 2004002613 A | 1/2004 |
| JP | 2004-292805 | 10/2004 |
| JP | 2006-016461 | 1/2006 |
| JP | 2006316269 | 11/2006 |
| JP | 2007-524715 | 8/2007 |
| JP | 20080248060 A | 10/2008 |
| JP | U3145603 | 10/2008 |
| JP | 2011-511120 | 4/2011 |
| JP | 2011511119 A | 4/2011 |
| KR | 1996-0012444 | 9/1996 |
| WO | 2000036006 A1 | 6/2000 |
| WO | WO 03/074604 A1 | 9/2003 |
| WO | 2006042364 A1 | 4/2005 |
| WO | 2006037157 A1 | 4/2006 |
| WO | 2008014573 A1 | 2/2008 |

OTHER PUBLICATIONS

Notice to Submit Release, dated Oct. 18, 2017, for Korean Application No. 10-2014-7028251.
Office Action for European Patent Application No. 12871391.4 dated Apr. 25, 2016.
Office Action for Taiwan Patent Application No. 102106121 dated May 26, 2016.
Office Action for Japanese Patent Application No. 2015-500374 dated Sep. 6, 2016 Notice of allowance for Japanese Patent Application No. 2015-500374 dated Jan. 5, 2017.
Office Action for European Patent Application No. 12871391.4 dated Dec. 7, 2016.
A. Ashori, et al., "Bio-based Composites from Waste Agricultural Residues." Waste Management, vol. 30, No. 4, Apr. 1, 2019.
International Preliminary Report on Patentability for International Application No. PCT/MY2012/000278 dated Nov. 11, 2013.
Supplemental European Search Report for European Patent Application No. 12871391 dated Jun. 6, 2015.
Extended European Search Report for European Patent Application No. 12871391.4 dated Jun. 18, 2015.
Search Report for Malaysian Patent Application No. 20127000072 dated Oct. 15, 2015.
Patent Examination Report No. 1 for Australian Patent Application No. 2012373360 dated Nov. 24, 2015.
Written Opinion for Sinapore Patent Application No. 11201404553V dated Feb. 4, 2016.
International Search Report issued by the Australian Patent Office In PCT/MY2012/000276 dated Mar. 8, 2013.
Notice to Submit Response, dated Jan. 10, 2019, for Korean Application No. 10-2018-7034248, 8 pages.
Office Action for Philippines Patent Application No. 1/2014/501751 dated Mar. 21, 2019, 4 pages.
Office Action for Australian Patent Application No. 2019200804 dated Aug. 9, 2019, 3 pages.
Notice of Decision for Rejection, dated Aug. 21, 2019, for Korean Application No. 10-2018-7034248, 5 pages.
Office Action for Japanese Patent Application No. 2018-135639 dated Sep. 3, 2019, 6 pages.
Notice of Decision for Rejection, dated Dec. 4, 2019, for Korean Application No. 10-2018-7034248, 6 pages.
Office Action for Philippines Patent Application No. 1/2014/501751 dated Nov. 11, 2019, 2 pages.
Office Action for Vietnamese Patent Application No. 1-2014-02552 dated Sep. 30, 2019, 4 pages.
Office Action for Japanese Patent Application No. 2017-017340 dated May 14, 2019, 36 pages.

* cited by examiner

THERMOPLASTIC STARCH COMPOSITION DERIVATIVES FROM AGRICULTURAL BYPRODUCTS

CROSS-REFERENCE TO RELATED APPLICATIONS

This application is a continuation of U.S. patent application Ser. No. 15/980,343, filed May 15, 2018 (issued as U.S. Pat. No. 10,196,490 on Feb. 5, 2019), which is a divisional of U.S. patent application Ser. No. 15/493,991, filed Apr. 21, 2017 (issued as U.S. Pat. No. 9,988,503 on Jun. 5, 2018), which is a divisional of U.S. patent application Ser. No. 15/080,151, filed Mar. 24, 2016 (issued as U.S. Pat. No. 9,650,475 on May 16, 2017), which is a continuation of U.S. patent application Ser. No. 14/371,982, filed Jul. 11, 2014 (issued as U.S. Pat. No. 9,328,223 on May 3, 2016), which is a national stage of International Application No. PCT/MY2012/000278, filed Nov. 21, 2012, and which claims priority to and benefit of Malaysian Patent Application No. PI 2012700072, filed Mar. 13, 2012; the entirety of each of the aforementioned applications is hereby incorporated by reference.

FIELD

The present disclosure relates to a thermoplastic starch composition and related methods. More specifically, the disclosed thermoplastic starch composition can be produced utilizing agricultural byproducts/waste containing relatively low starch content under an optimized process.

BACKGROUND

Starch is a natural polymer composed mainly of two major polysaccharides, namely the linearly linked amylose and the branched amylopectin. Starch possesses thermoplastic behavior though it exits in granular form in its natural state. Starch can be transformed into a molten plastic state, when subjected to shearing force at a temperature of 90 to 180° C. in the presence of suitable plasticizer. In the starch, the weaker hydrogen bond between the polysaccharides and the plasticizer replaces the original inter-polysaccharides hydrogen bond rendering the thermoplastic starch soft and ductile. Specifically, the new bonding between the plasticizer and the polysaccharides greatly reduces the secondary bonds holding the long chain polysaccharides. In view of that starch is a renewable resource, thermoplastic starch is a sustainable product. Yet, it suffers from two major shortcomings, high water solubility and poor mechanical strength, compared to conventional synthetic plastic. In order to improve mechanical properties and reduce its water absorbing properties, modifications have been made to the starch. For example, European patent application no. 0327505 describes a polymeric blend of starch and water insoluble synthetic thermoplastic polymer claiming a derived polymeric composition with better mechanical property and reduced water solubility. Guy et. al. claims another starch derived thermoforming compound containing at least one hydroxycarboxylic acid salt that the compound acquired is claimed to have maximum loss tangent in wide range of temperature in Canadian patent application no. 2060409. Further starch modification can be found in International patent publication no. 03074604 which provides grafted polymers formed using compatibilizer instead of plasticizer to reduce water absorption into the formed polymer. Co-continuous starch substantially free of water is described in U.S. Pat. No. 6,605,657 and starch reinforced by particulate filler is disclosed in another U.S. Pat. No. 6,231,970.

SUMMARY

The present disclosure provides a thermoplastic starch (TPS) composition/bio-resin derived from agro-industrial byproducts/waste. More precisely, the agro-industrial waste used in the present disclosure is relatively lower in starch content and have subjected to special processing stage in order to achieve the desired property. In recent years, effort has been put into utilizing agro-industrial wastes for the manufacturing of value-added products such as biofuels, biomaterials and the like. Recycling these agro-industrial waste can alleviate environmental problems associated with the waste disposal and reduce dependence on petroleum resources. Considering that TPS is a product necessary using starch as the major forming constituent, it is practical to employ such waste of agro-industrial in its production as long as some technical problems inherited from such use are solved. For instance, agro-industrial waste contains much lower starch content compared to normal starch granule that TPS derived thereof may fail to attain the desired plasticity and degradability. Yet, the present disclosure provides an agricultural waste-derived TPS composition possessing physiochemical properties which meets the industrial acceptable standard in terms of mechanical properties as well International definition for a bio-based material.

According to some embodiments of the disclosure, a method for forming a bio-resin includes forming a first blend by combining an agricultural byproduct having a starch content of less than 50% by dry weight and a plasticizer, forming a second blend by combining a synthetic polymer and a coupling agent, and compounding the first blend and the second blend to form a bio-resin. According to some embodiments, the compounding includes combining and coextruding the first blend and second blend. According to some embodiments, the compounding includes combining the first blend and the second blend in an extruder and extruding the bio-resin from the extruder. According to some embodiments, the compounding includes combining the first blend and the second blend in a twin-screw extruder and extruding the bio-resin from the twin-screw extruder. According to some embodiments, the compounding includes combining the first blend and the second blend in an extruder and extruding the bio-resin from the extruder, the extruder having a length to diameter ratio from 30 to 60. According to some embodiments, the compounding is done at a temperature of 140° C. or higher. According to some embodiments, forming the first blend includes combining a filler material with the agricultural byproduct having a starch content less than 50% dry weight and the plasticizer. According to some embodiments, forming the first blend includes combining a natural filler material with the agricultural byproduct having a starch content of less than 50% by dry weight and the plasticizer. According to some embodiments, forming the first blend includes combining a pulverized powder natural filler material with the agricultural byproduct having a starch content of less than 50% by dry weight and the plasticizer. According to some embodiments, forming the first blend includes combining a natural filler material having an average particle size of 170 microns or less with the agricultural byproduct having a starch content of less than 50% by dry weight and the plasticizer. According to some embodiments, a content of amylose in the agricultural byproduct is less than 20% by dry weight. According to some embodiments, the plasticizer is one or more of the following: sugar alcohols, polyols, sorbitol ethoxylate, glycerol ethoxylate, pentaerythritol ethoxylate, sorbitol acetate, pentaerythritol acetate, water, urea, urea derivatives, sugar alcohol anhydrides, phthalate esters, dimethylsuccinate, diethylsuccinate, esters of dimethylsuccinate, esters of diethylsuccinate, glycerol monoacetate, glycerol diacetate, glycerol triacetate, glycerol mono acid esters, citric acid esters, adipic acid esters, stearic acid esters, oleic acid esters, copolymers of ethylene and acrylic acid, polyethylene grafted maleic acid, polybutadiene-coacrylic acid, polybutadiene-co-maleic acid, propylene-coacrylic acid, polypropylene-co-maleic acid, adipic acid derivatives, benzoic acid derivatives, citric acid derivatives, phosphoric acid derivatives, sebacic acid derivatives, monoglyceride, diglycerides, acetylated monoglyceride, acetylated glycerol mono stearate, acetylated glycerol monoester-12-hydroxystearic acid, acetic acids esters of glycerol, glycerol monopropionate, glycerol dipropionates and tripropionates, butanoates, stearates, alkylamides, trimethylolpropane, dimethyl sulfoxide, mannitol monoacetate, and/or mannitol monoethyoxylate The present disclosure includes a polymer composition containing at least 25% by weight of renewable carbon based on test method in The American Society For Testing and Material (ASTM) D6866 meeting the bio-based standard as setting forth by the Japan BioPlastic Association (JBPA), United State Department of Agriculture (USDA) as well as DIN Certco and Vincotte in Europe.

Further object of the disclosed invention is to offer a TPS composition of agro-industrial waste being acquired through a single compounding process through a unique screw configuration in the extrusion stage.

Still, another object of the disclosed invention is to offer a TPS composition obtained from pre-treated agro-industrial waste.

At least one of the preceding objects is met, in whole or in part, by the present invention, in which one of the embodiments of the present invention includes a thermoplastic starch composition acquired from compounding a mixture comprising starch-containing agricultural waste in 45 to 70% by weight of total composition that the agricultural waste contains starch content less than 50% in dry weight; thermoplastic synthetic polymer in 25 to 50% by weight of total composition; plasticizer in 1 to 10% by weight of total composition; and coupling agent in 1 to 5% by weight of total composition; wherein the compounding is performed at a first temperature which is higher than room temperature. Preferably, the agricultural waste is pre-treated or functionalized with a reactant having functional group selected from the group consisting of primary alkylamine, secondary alkylamine, tertiary alkylamine, stearate ester, oleate ester, ecucate ester, ethoxy, methoxy, silane, vinyl, hydroxyl or any combination thereof at a second temperature, which is higher than room temperature but lower than the first temperature, prior to compounding the mixture. More preferably, the agricultural waste is pulverized powder of tamarind kernel, ratanjot, castor seed, Jatropha seeds, moringa seed, neem seed, cocoa bean skin, coffee bean skin, rice husk, sugar cane bagasse, coconut fiber, palm oil fruit bunch, wood chips, and saw dust.

In another respect, the thermoplastic synthetic polymer is vinylpolymer, polystyrenes, polylactic acid, polyhydroxyl adipate or polyvinyl alcohol, polyacrylonitriles, polyvinylcarbazols, poly(alkylene oxides), poly(hydroxy butyrate), polyimides, polyarylethers, poly(alkylene terephthalates), poly carbonates, polyester, polypropylene, polyethylene, and polyisobutylenes.

In another aspect, the disclosed TPS composition further comprises an initiator in 0.01 to 5% by weight of total composition, wherein the initiator is selected from any one or combination of sodium peroxide, tert-butyl hydroperoxide, di-tert-butyl peroxide, and dicumyl peroxide.

In another aspect, the mixture further comprises filler in 25 to 35% by weight of total composition that the natural filler is pulverized powder of any one or combination of wood, kenaf, coconut husk and rice husk. Preferably, the pulverized powder has a particle size not more than 170 micron.

In another aspect, the mixture further comprises a processing aid in 0.2 to 2% by weight of total composition selected from any one or combination of non-metallic stearates, paraffin wax, polyester wax, stearyl stearate, distearyl phthalate, pentaerythritol adipate stearate, ethylene glycol distearate, pentaerythritol tetrastearate, glycerol tristearate, polyethylene glycol monostearate, glycerol monooleate, glycerol distearate, N,N-ethylene bis-stearamide, fatty acids derivatives and the like.

In another aspect, the mixture further comprises plasticizer in 0.01 to 10% by weight of total composition. Preferably, the plasticizer used in preparing the TPS composition is any one or combination of sugar alcohol, polyols, sorbitl ethoxylate, glycerol ethoxylate, pentaerythritol ethoxylate, sorbitol acetate, pentaerythritol acetate, water, urea or urea derivatives, anhydrides of sugar alcohols, phthalate esters, dimethyl and diethylsuccinate and related esters, glycerol monoacetate, glycerol diacetate, glycerol triacetate, glycerol mono acid esters, citric acid esters, adipic acid esters, stearic acid esters, oleic acid esters, copolymers of ethylene and acrylic acid, polyethylene grafted maleic acid, polybutadiene-co-acrylic acid, polybutadiene-co-maleic acid, propylene-co-acrylic acid, polypropylene-co-maleic acid and other hydrocarbon based acid, adipic acid derivatives, benzoic acid derivatives, citric acid derivatives, phosphoric acid derivatives, sebacic acid derivatives, monoglyceride, diglycerides, acetylated monoglyceride, acetylated glycerol monostearate, acetylated glycerol monoester-12-hydroxystearic acid, esters of glycerin, glycerol monopropionate, glycerol dipropionates and tripropionates, butanoates, stearates, alkylamides, trimethylolpropane, dimethyl sulfoxide, mannitol monoacetate, and mannitol monoethyoxylate.

In another aspect, the first blend further comprises coupling agent in 0.01 to 5% by weight of total composition. Preferably, the coupling agent is any one or combination of ethylene vinyl acetate, ethylene vinyl alcohol, polyethylene-co-acrylic acid, polyethylene grafted maleic anhydride, maleic anhydride modified polyolefin, maleic anhydride, acrylic acid, vinyl acetate, vinyl alcohol, amino, amide or acrylate, polyvinyl-alcohol-co-vinyl acetate copolymer, ethylene/vinyl alcohol/vinyl acetate copolymers, ethylene/vinyl chloride/vinyl alcohol/vinyl acetate graft copolymers, vinyl alcohol/vinyl acetate/vinyl chloride/diacryl amide copolymers, vinyl alcohol/vinyl butyral copolymers, vinyl alcohol/styrene copolymers, poly acrylic acid-co-vinyl acetate copolymer, ethylene/acrylic acid/vinyl acetate copolymers, ethylene/vinyl chloride/acrylic acid/vinyl acetate graft copolymers, acrylic acid/acrylonitrile copolymer, ethylene/propylene/acrylic acid copolymer, styrene/acrylic acid copolymers, vinyl benzyl amino ethyl amino propyl trimethoxy silane, glycidyl methacrylate modified polymers, graft copolymers of methyl methacrylate According to another preferred embodiment, the disclosed invention is an extruded thermoplastic starch composition comprising starch-containing agricultural waste in 45 to 70% by weight of total composition that the agricultural waste contains starch content less than 50% in dry weight; thermoplastic synthetic polymer in 25 to 50% by weight of total composition; plasticizer in 1 to 10% by weight of total composition; and coupling agent in 1 to 5% by weight of total composition; wherein the agricultural waste and the plasticizer are premixed to form a first blend while the thermoplastic synthetic polymer and the coupling agent are premixed to form a second blend prior to extruding the first and second blends together at a screw extruder having a length/diameter ratio of 30 to 40 by a speed of 200 to 300 rpm under 140° C. to 170° C. to produce the thermoplastic starch composition. Likewise, this preferred embodiment may further include an initiator in 0.01 to 5% by weight of total composition, wherein the initiator is selected from any one or combination of Sodium peroxide, Tert-butyl hydroperoxide, Di-tert-butyl peroxide, and Dicumyl peroxide

DETAILED DESCRIPTION

Figure 1:
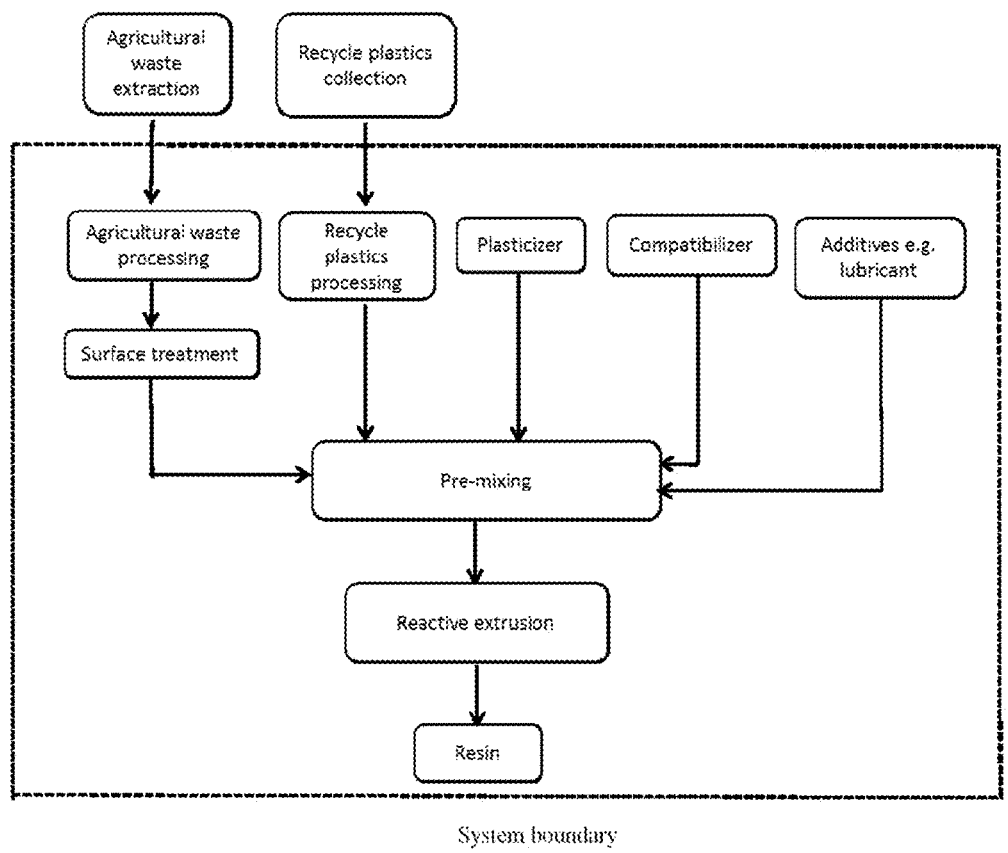
FIG. 1 is a schematic diagram showing the system boundary for the life cycle assessment study on the TPS composition in Example 1.

One skilled in the art will readily appreciate that the present invention is well adapted to carry out the objects and obtain the ends and advantages mentioned, as well as those inherent therein. The embodiment describes herein is not intended as limitations on the scope of the invention.

The "TPS composition" or "bio-resin" described herein throughout the specification and the appended claims refer to blended polymeric material having thermoplastic starch as constituent and containing one or more additives such as thermoplastic synthetic polymer, coupling agent, filler, antioxidant, coloring agent, masterbatch and the like in molten or solid state.

The present disclosure includes a bio-resin/thermoplastic starch composition acquired from compounding a mixture comprising starch-containing agricultural waste in 45 to 70% by weight of total composition that the agricultural waste contains starch content less than 50% in dry weight; thermoplastic synthetic polymer in 25 to 50% by weight of total composition; plasticizer in 1 to 10% by weight of total composition; and coupling agent in 1 to 5% by weight of total composition; wherein the compounding is performed at a first temperature which is higher than room temperature. Preferably, the agricultural waste is pre-treated or functionalized with a reactant having functional group selected from the group consisting of primary alkylamine, secondary alkylamine, tertiary alkylamine, stearate ester, oleate ester, ecucate ester, ethoxy, methoxy, silane, vinyl, hydroxyl or any combination thereof at a second temperature, which is higher than room temperature but lower than the first temperature, prior to compounding the mixture. Bringing these reactants with specified functional groups into contact with the agricultural waste prior to the compounding process at the second temperature improves wettability of the agricultural waste rendering better production of the compounded thermoplastic starch composition. In some embodiments, the reactant can be 0.5 to 2.0% by weight of total composition. In some embodiments, the first temperature mentioned herein ranges between 140 to 170° C. and the second temperature is about 65 to 105° C.

According to another embodiment, the functionalised agricultural waste and the plasticizer are premixed to form a first blend while the thermoplastic synthetic polymer and the coupling agent are premixed to form a second blend prior to compounding the first and second blends together to produce the thermoplastic starch composition. Preparing the components into separated blends in the present invention may further improve the yielded thermoplastic starch composition. Accordingly, the first blend and second blend are processed in single extrusion step to form the desired TPS composition.

Still, in another embodiment, bio-resin/TPS composition can be acquired through processing the first and second blends in the optimized condition without having the agricultural waste being functionalized by the reactant. Particularly, it is an extruded or compounded thermoplastic starch composition comprising starch-containing agricultural waste in 45 to 70% by weight of total composition that the agricultural waste contains starch content less than 50% in dry weight; thermoplastic synthetic polymer in 25 to 50% by weight of total composition; plasticizer in 1 to 10% by weight of total composition; and coupling agent in 1 to 5% by weight of total composition; wherein the agricultural waste and the plasticizer are premixed to form a first blend while the thermoplastic synthetic polymer and the coupling agent are premixed to form a second blend prior to extruding the first and second blends together at a screw extruder having a length/diameter ratio of 30 to 60 by a speed of 200 to 300 rpm under 140° C. to 170° C. to produce the thermoplastic starch composition.

In some embodiments, the agricultural waste employed in different embodiments of the present disclosure is pulverized powder of, but not limited to, tamarind kernel, ratanjot, castor seed, Jatropha seeds, moringa seed, neem seed, cocoa bean skin, coffee bean skin, rice husk, sugar cane bagasse, coconut fiber, palm oil fruit bunch, palm oil fruit bunch waste, wood chips, and saw dust. Apart from that, the disclosed TPS composition can utilize as well solid waste produced in starch processing activities from food crops like tapioca, yam, taro, konjac, potato or burdock. The agricultural waste used in the present disclosure is relatively lower in starch content compared to commercially available product. Particularly, the agricultural waste of the present invention contains starch content less than 50%, such between 15% to 50%, in dry weight, and in some embodiments, amylose content lower than 20%. Food crops used in conventional TPS production contains more than 70% in dry weight of starch content and amylose content not lower than 25% by weight. Presence of large amount of non-starch material, such as fibre content not lower than 10% by weight, in these wastes can significantly affect mechanical property and plasticity of the formed TPS composition. To produce TPS composition meeting industrial standard from these wastes, the agricultural waste needs to be functionalised first in order to react better with the rest of the components in the subsequent compounding process. Or having the agricultural waste and other ingredients for the production of the TPS prepared into two different blends prior to compounding or extruding the two blends, namely the first blend and the second blend, together to finally acquire the TPS composition without going through the functionalising step. Essentially, the first blend in the present invention comprises mixture of the starch-containing agricultural waste and the plasticizer. The starch-containing agricultural waste and the plasticizer are pre-mixed in a mixer at the speed of 50 to 500 rpm for a duration of 5 to 30 minutes. In contrast, the thermoplastic synthetic polymer and the coupling agent are premixed using a low shear mixer or tumbler mixer for a period of 10 to 30 minutes rather than being subjected to high shearing force in the pre-mix of first blend. According to one embodiment, both first blend and second blend are fed and processed in a twin screw extruder with a length to diameter ratio of 30 to 60, more preferably at 50 to 55, in a temperature of 140 to 170° C. with screw speed of 200 to 300 rpm. The elevated temperature in the extruder melts portion of mixed the first and second blends to produce the TPS composition. Further, the screw is configured to handle high vapour volume generated from the starch-containing agricultural waste during mixing. Nevertheless, the disclosed TPS composition can be obtained as well through firstly subjecting the agricultural waste to functionalising and subsequent blends preparation prior to final compounding.

Preferably, the thermoplastic synthetic polymer employed in the present invention is water insoluble. The thermoplastic synthetic polymer can be vinylpolymer such as poly (vinyl chloride) and poly(vinyl acetates), polystyrenes, polylactic acid, polyhydroxyl adipate or polyvinyl alcohol, polyacrylonitriles, polyvinylcarbazols, poly(alkylene oxides), poly(hydroxy butyrate), polyimides, polyarylethers, poly(alkylene terephthalates), poly carbonates, polyester, poly olefin like polypropylene, polyethylene, and polyisobutylenes. It is likely as well thermoplastic copolymers like ethylene/vinyl acetate copolymer, ethylene/vinyl alcohol copolymer, ethylene/acrylic acid copolymers, ethylene/ethyl acrylate copolymers, ethylene/methyl acrylate copolymers; acrylonitrile/butadiene/styrene copolymer, styrene/acrylonitrile copolymer or any combination derived thereof to be used for production of the disclosed TPS composition. The amount of thermoplastic synthetic polymer used in the present invention preferably ranges from 25 to 50%, more preferably in between 25 to 40% by weight of total composition.

In order to produce the disclosed TPS composition through a single extrusion process, an initiator in an amount of 0.01 to 5% by weight of total composition is added to initiate the polymerization process of the thermoplastic synthetic polymer in the second blend. Preferably, the initiator is selected from any one or combination of Sodium peroxide, Tert-butyl hydroperoxide, Di-tert-butyl peroxide, and Dicumyl peroxide.

The disclosed invention also includes plasticizer in order to have the starch-containing agricultural waste attained the desired plasticity to be workable in further process. Owing to the fact that starch has melting temperature approaches the decomposition temperature, mere heating the starch-containing agricultural waste fail to completely transform the starch in the waste into its molten state while the molten state of the starch can only be attained in the addition of plasticizer in the TPS forming process. The plasticizer described herein shall refer to any suitable plasticizer capable of producing TPS composition. The plasticizer is any one or combination of sugar alcohol, polyols, sorbitol ethoxylate, glycerol ethoxylate, pentaerythritol ethoxylate, sorbitol acetate, pentaerythritol acetate, water, urea or urea derivatives, anhydrides of sugar alcohols, phthalate esters, dimethyl and diethylsuccinate and related esters, glycerol monoacetate, glycerol diacetate, glycerol triacetate, glycerol mono acid esters, citric acid esters, adipic acid esters, stearic acid esters, oleic acid esters, copolymers of ethylene and acrylic acid, polyethylene grafted maleic acid, polybutadiene-co-acrylic acid, polybutadiene-co-maleic acid, propylene-co-acrylic acid, polypropylene-co-maleic acid and other hydrocarbon based acid, adipic acid derivatives, benzoic acid derivatives, citric acid derivatives, phosphoric acid derivatives, sebacic acid derivatives, onoglyceride, diglycerides, acetylated monoglyceride, acetylated glycerol monostearate, acetylated glycerol monoester-12-hydroxystearic acid, acesters of glycerin, glycerol monopropionate, glycerol dipropionates and tripropionates, butanoates, stearates, alkylamides, trimethylolpropane, dimethyl sulfoxide, mannitol monoacetate, and mannitol monoethyoxylate.

To gain better compatibility and dispersion characteristics of the starch and the thermoplastic synthetic polymer in the produced TPS composition, coupling agent, also known as compatibilizer, is used. The coupling agent can be placed in the mixture for compounding with the functionalized agricultural waste. As described above, the coupling agent is added into the second blend in the embodiment having separated blends for the compounding. Under heated and pressurized environment, presence of the coupling agent promotes covalent linkage formation in between the starch and the thermoplastic synthetic polymer. More specifically, the coupling agents are generally hydrophobic polymers which carries a functional group particularly to react and bind with hydroxyl group in the starch while the rest of the hydrophobic portion interacts with the thermoplastic synthetic polymer. The addition coupling agent allows the starch to indirectly bind with the thermoplastic synthetic polymer therefore forming a physically strong composition collectively. Relying on the types of thermoplastic synthetic polymer used and the derived TPS composition, the coupling agent can be any one or combination of ethylene vinyl acetate, ethylene vinyl alcohol, polyethylene-co-acrylic acid, polyethylene grafted maleic anhydride, maleic anhydride modified polyolefin, maleic anhydride, acrylic acid, vinyl acetate, vinyl alcohol, amino, amide or acrylate, polyvinyl-alcohol-co-vinyl acetate copolymer, ethylene/vinyl alcohol/vinyl acetate copolymers, ethylene/vinyl chloride/vinyl alcohol/vinyl acetate graft copolymers, vinyl alcohol/vinyl acetate/vinyl chloride/diacryl amide copolymers, vinyl alcohol/vinyl butyral copolymers, vinyl alcohol/styrene copolymers, poly acrylic acid-co-vinyl acetate copolymer, ethylene/acrylic acid/vinyl acetate copolymers, ethylene/vinyl chloride/acrylic acid/vinyl acetate graft copolymers, acrylic acid/acrylonitrile copolymer, ethylene/propylene/acrylic acid copolymer, styrene/acrylic acid copolymers, vinyl benzyl amino ethyl amino propyl trimethoxy silane, glycidyl methacrylate modified polymers, graft copolymers of methyl methacrylate One of the embodiments of the produced TPS composition includes as well filler. Preferably, the filler is mixed with the first blend or the mixture directly according to the mode of operation in producing the TPS composition. It is in an amount of 25 to 35% by weight of total composition. The resulting TPS composition can greatly affected by the chemical and physical properties of the filler especially the rheology of the formed TPS. Depending on its melting point, the filler may present as discrete particles separated from the bound matrix of the starch and the thermoplastic synthetic polymer or being melted to partially or completely integrated into the bound matrix of the starch and the thermoplastic synthetic polymer. With melting temperature higher than the processing temperature, presence of the solid filler particulate in the molten starch and thermoplastic synthetic polymer increase the viscosity of the total mixture thus affecting the morphology of the derived TPS composition.

More preferably, the filler in the present invention is made of organic material or being natural origin which is any one or combination of wood, kenaf, coconut husk, rice husk, seagel, cork, seeds. The natural filler is preferably prepared into the form of pulverized powder with a particle size not more than 170 micron. Nonetheless, other inorganic or metal filler like metallic flakes may be incorporated in the disclosed TPS composition in other embodiments relying upon the TPS composition resulted.

To further improve workability and flexibility of the disclosed TPS composition, the disclosed invention, in one embodiment, includes lubricating agent in 0.2 to 2% by weight of total composition. Preferably, the lubricating agent is inert in relative to the plasticizer and prepared in the first blend. The lubricating agent can be selected from any one or combination of non-metallic stearates, paraffin wax, polyester wax, stearyl stearate, distearyl phthalate, pentaerythritol adipate stearate, ethylene glycol distearate, pentaerythritol tetrastearate, glycerol tristearate, polyethylene glycol monostearate, glycerol monooleate, glycerol distearate, N,N-ethylene bis-stearamide, fatty acids derivatives and the like.

Still, the TPS composition, particularly in the first blend, may further comprise antioxidant or ant-oxidative agent in an amount of 0.2 to 1% by weight of total composition to prevent polymer degradation in the TPS forming process caused by the applied heat.

To improve aesthetic effect of the products derived from the TPS composition, the second blend forming the disclosed TPS composition may be further furnished with coloring agent in an amount of 3 to 10% by weight of total composition in one of the embodiments. The coloring agent can be of organic or inorganic origin or azo dyes. Still, color masterbatch of 3 to 10% by weight of total composition is added into the second blend to impart the desired color to the produced TPS composition. Another embodiment of the disclosed composition may have additive masterbatch in the amount of 0.1 to 10% by weight of total composition processed together with the first and second blends to produce TPS composition with improved physiochemical properties particularly in antistatic, anti-microbial, anti-oxidative, corrosion resistance, UV resistance and so on.

Pursuant to another preferred embodiment, the present invention also disclosed a method of producing thermoplastic starch composition comprising the steps of compounding starch-containing agricultural waste together with a mixture of a thermoplastic synthetic polymer in 25 to 50% by weight of total composition, a plasticizer in 1 to 10% by weight of total composition, and a coupling agent in 1 to 5% by weight of total composition at a first temperature higher than room temperature, wherein the starch-containing agricultural waste is 45 to 70% by weight of total composition and the agricultural waste contains starch content less than 50% in dry weight. Preferably, the disclosed method further comprises the step of reacting the starch-containing agricultural waste with a reactant having functional group selected from the group consisting of primary alkylamine, secondary alkylamine, tertiary alkylamine, stearate ester, oleate ester, ecucate ester, ethoxy, methoxy, silane, vinyl, hydroxyl or any combination thereof at a second temperature, which is higher than room temperature but lower than the first temperature, prior to the compounding step. Accordingly, the first temperature is 140° C. to 170° C. while the second temperature is around 65° C. to 105° C.

Like in the foregoing description, the agricultural waste used in the disclosed method is relatively lower in starch content compared to commercially available product. Particularly, the agricultural waste of the present invention contains starch content less than 50%, more preferably 15% to 50%, in dry weight and amylose content lower than 20%. Food crops used in conventional TPS production contains more than 70% in dry weight of starch content and amylose content not lower than 25% by weight. Presence of large amount of non-starch material, such as fibre content not lower than 10% by weight, requires the agricultural waste to be pre-treated or functionalised first before proceeding to compounding. Preferably, the agricultural waste is pulverized powder of, but not limited to, tamarind kernel, ratanjot, castor seed, Jatropha seeds, moringa seed, neem seed, cocoa bean skin, coffee bean skin, rice husk, sugar cane bagasse, coconut fiber, palm oil fruit bunch, wood chips, and saw dust. Apart from that, the disclosed method can utilize as well solid waste produced in starch processing activities from food crops like tapioca, yam, taro, konjac, potato or burdock.

In one embodiment, the mixture further comprising an initiator in 0.01 to 5% by weight of total composition that the initiator is selected from any one or combination of Sodium peroxide, Tert-butyl hydroperoxide, Di-tert-butyl peroxide, and Dicumyl peroxide. Similarly, the mixture may further comprise as well a filler in 25 to 35% by weight of total composition, an antioxidant in 0.2 to 1% by weight of total composition, coloring agent in 3 to 10% by weight of total composition or any combination derived thereof.

In order to obtain the TPS composition of desired physiochemical properties, the plasticizer used in the disclosed method can be any one or combination of sugar alcohol, polyols, sorbitl ethoxylate, glycerol ethoxylate, pentaerythritol ethoxylate, sorbitol acetate, pentaerythritol acetate, water, urea or urea derivatives, anhydrides of sugar alcohols, phthalate esters, dimethyl and diethylsuccinate and related esters, glycerol monoacetate, glycerol diacetate, glycerol triacetate, glycerol mono acid esters, citric acid esters, adipic acid esters, stearic acid esters, oleic acid esters, copolymers of ethylene and acrylic acid, polyethylene grafted maleic acid, polybutadiene-co-acrylic acid, polybutadiene-co-maleic acid, propylene-co-acrylic acid, polypropylene-co-maleic acid and other hydrocarbon based acid, adipic acid derivatives, benzoic acid derivatives, citric acid derivatives, phosphoric acid derivatives, sebacic acid derivatives, onoglyceride, diglycerides, acetylated monoglyceride, acetylated glycerol monostearate, acetylated glycerol monoester-12-hydroxystearic acid, esters of glycerin, glycerol monopropionate, glycerol dipropionates and tripropionates, butanoates, stearates, alkylamides, trimethylolpropane, dimethyl sulfoxide, mannitol monoacetate, and mannitol monoethyoxylate.

In another embodiment of the disclosed method, the mixture further comprises a processing aid in 0.2 to 2% by weight of total composition selected from any one or combination of non-metallic stearates, paraffin wax, polyester wax, stearyl stearate, distearyl phthalate, pentaerythritol adipate stearate, ethylene glycol distearate, pentaerythritol tetrastearate, glycerol tristearate, polyethylene glycol monostearate, glycerol monooleate, glycerol distearate, N,N-ethylene bis-stearamide, and fatty acids derivatives.

According to some embodiments of the disclosure, a method for forming a bio-resin includes forming a first blend by combining an agricultural byproduct having a starch content of less than 50% by dry weight and a plasticizer, forming a second blend by combining a synthetic polymer and a coupling agent, and compounding the first blend and the second blend to form a bio-resin. According to some embodiments, the compounding includes combining and coextruding the first blend and second blend. According to some embodiments, the compounding includes combining the first blend and the second blend in an extruder and extruding the bio-resin from the extruder. According to some embodiments, the compounding includes combining the first blend and the second blend in a twin-screw extruder and extruding the bio-resin from the twin-screw extruder. According to some embodiments, the compounding includes combining the first blend and the second blend in an extruder and extruding the bio-resin from the extruder, the extruder having a length to diameter ratio from 30 to 60. According to some embodiments, the compounding is done at a temperature of 140° C. or higher. According to some embodiments, forming the first blend includes combining a filler material with the agricultural byproduct having a starch content less than 50% dry weight and the plasticizer. According to some embodiments, forming the first blend includes combining a natural filler material with the agricultural byproduct having a starch content of less than 50% by dry weight and the plasticizer. According to some embodiments, forming the first blend includes combining a pulverized powder natural filler material with the agricultural byproduct having a starch content of less than 50% by dry weight and the plasticizer. According to some embodiments, forming the first blend includes combining a natural filler material having an average particle size of 170 microns or less with the agricultural byproduct having a starch content of less than 50% by dry weight and the plasticizer. According to some embodiments, a content of amylose in the agricultural byproduct is less than 20% by dry weight. According to some embodiments, the plasticizer is one or more of the following: sugar alcohols, polyols, sorbitol ethoxylate, glycerol ethoxylate, pentaerythritol ethoxylate, sorbitol acetate, pentaerythritol acetate, water, urea, urea derivatives, sugar alcohol anhydrides, phthalate esters, dimethylsuccinate, diethylsuccinate, esters of dimethylsuccinate, esters of diethylsuccinate, glycerol monoacetate, glycerol diacetate, glycerol triacetate, glycerol mono acid esters, citric acid esters, adipic acid esters, stearic acid esters, oleic acid esters, copolymers of ethylene and acrylic acid, polyethylene grafted maleic acid, polybutadiene-coacrylic acid, polybutadiene-co-maleic acid, propylene-coacrylic acid, polypropylene-co-maleic acid, adipic acid derivatives, benzoic acid derivatives, citric acid derivatives, phosphoric acid derivatives, sebacic acid derivatives, monoglyceride, diglycerides, acetylated monoglyceride, acetylated glycerol mono stearate, acetylated glycerol monoester-12-hydroxystearic acid, acetic acids esters of glycerol, glycerol monopropionate, glycerol dipropionates and tripropionates, butanoates, stearates, alkylamides, trimethylolpropane, dimethyl sulfoxide, mannitol monoacetate, and/or mannitol monoethoxylate Example 1

In order to prepare sample 1, the starch residue (waste) is pre-treated or functionalized with alkyl amine and esters blends in the presence of dicumyl peroxide in a high speed mixer that are able to be heated up to 120° C. for a period of 10 min. After this pre-treatment process, Di-substituted glycerol will be added into the starch residue and mixed for 5 min prior to the addition of other components like calcium stearate, butylated hydroxytoluene, acetate copolymers and PP to be mixed for a further 5 min before discharging the mixed composition into a gravimetric feeder of a twin screw extruder for reactive extrusion/compounding process to take place. The setting of the temperature for reactive extrusion and compounding process is 140-170° C. for the barrels and the screw speed is 200 rpm. Resins obtained from the twin screw extruder is then dried at 80° C. for a minimum of 2 hrs before sheet extrusion using a single screw extruder with an L/D of 25 to produce extruded sheet having a thickness of 0.5 mm and width of 370 mm for mechanical tests using a Universal Tensile Testing machine. The dumbbell test pieces are conditioned for a period of 48 hrs at 20° C./55% RH before tests.

For acquiring sample 2, the kernel powder (waste) is pre-treated or functionalized with silanol in the presence of dicumyl peroxide in a high speed mixer that are able to be heated up to 120° C. for a period of 10 min. After this pre-treatment process, amides and fatty acids derivatives will be added into the kernel powder and mixed for 5 min prior to the addition of other components like oxidized PE wax, butylated hydroxytoluene, maleic anhydride grafted polystyrene and polystyrene (PS) to be mixed for a further 5 min before discharging the mixed composition into a gravimetric feeder of a twin screw extruder for reactive extrusion/compounding process to take place. The setting of the temperature for reactive extrusion and compounding process is 140-160° C. for the barrels and the screw speed is 200 rpm. Resins obtained from the twin screw extruder is then dried at 80° C. for a minimum of 2 hrs before sheet extrusion using a single screw extruder with an L/D of 25 to produce extruded sheet having a thickness of 0.5 mm and width of 370 mm for mechanical tests using a Universal Tensile Testing Machine. The dumbbell test pieces are conditioned for a period of 48 hrs at 20° C./55% RH before tests.

Mechanical properties of the sample 1 and 2 are presented in table 1 below.

TABLE 1

|  | Sample 1 | Sample 2 |
|---|---|---|
| Formulations |  |  |
| Agricultural waste (wt %) | 60$^a$ | 60$^I$ |
| Fossil based plastics (wt %) | 30.3$^b$ | 30.3$^{II}$ |
| Compatibilizers (wt %) | 2$^c$ | 2$^{III}$ |
| Plasticizer (wt %) | 5$^d$ | 5$^{IV}$ |
| Surface Modifier (wt %) | 0.5$^e$ | 0.5$^V$ |
| Catalyst (wt %) | 0.2$^f$ | 0.2$^{VI}$ |
| Processing aid (wt %) | 1.5$^g$ | 1.5$^{VII}$ |
| Antioxidant (wt %) | 0.5$^h$ | 0.5$^{VIII}$ |
| Mechanical Properties |  |  |
| Maximum Stress (MPa) | 12 | 18 |
| Elongation at break (%) | 130 | 15 |
| Young Modulus (MPa) | 1170 | 1930 |

Notes:
$^a$Starch residue
$^b$PP
$^c$acetate copolymers
$^d$Di-substituted glycerol
$^e$alkyl amine and esters blends
$^f$Dicumyl peroxide
$^g$calcium stearate
$^h$butylated hydroxytoluene
$^I$Kernel powder
$^{II}$PS
$^{III}$maleic anhydride grafted PS
$^{IV}$amides and fatty acids derivatives
$^V$Silanol
$^{VI}$Dicumyl peroxide
$^{VII}$Oxidized PE wax
$^{VIII}$butylated hydroxytoluene

Example 2

Carbon footprint of sample 1 in example 1 (from cradle to polymer factory gate) was calculated according PAS 2050 [1]. The PAS 2050 allows immaterial emissions to be excluded i.e. any single source resulting in less than 1% of total emissions. However, the total proportion of immaterial emission sources cannot exceed 5% of the full product carbon footprint. Hence the carbon footprint for surface modifier, catalyst, compatibilizers and other additives have been excluded.

For the starch residue, calculation include diesel used for the transportation from supplier (i.e. 13 kg of diesel for a 26 km distance) as well as electricity used for the processing e.g. drying and pulverization of starch residue (i.e. 0.26 kWh/kg of starch residues). The energy use for the cultivation of the plant where the starch come from is excluded as the present invention is using only the waste or starch residue from the starch production.

For the recycle PP, calculation include diesel used for the transportation from supplier (i.e. 5 kg of diesel for a 10 km distance) as well as energy used for the pelletizing of recycle PP (0.06 kWh/kg of recycle PP). And the embodied energy for recycle PP is 36-44 MJ/kg and carbon footprint is 1.1-1.2 kg $CO_2$e/kg recycle PP as reported by M. F. Ashby [2].

For the Di-substituted glycerol, calculation include diesel used for the transportation from supplier (i.e. 4 kg of diesel for a 8 km distance) as well as energy used for the production of Di-substituted glycerol which is obtained from the supplier (i.e. 52.33 MJ/kg of product and its $CO_2$ emission is 1.96 kg$CO_2$e/kg of product).

Production energy for the TPS composition in Example 1 include electricity used for pre-mixing (i.e. 0.06 kwh/kg) as well as electricity used for reactive extrusion (i.e. 0.94 kwh/kg) to produce Example 1 in resins form.

Figure 2:
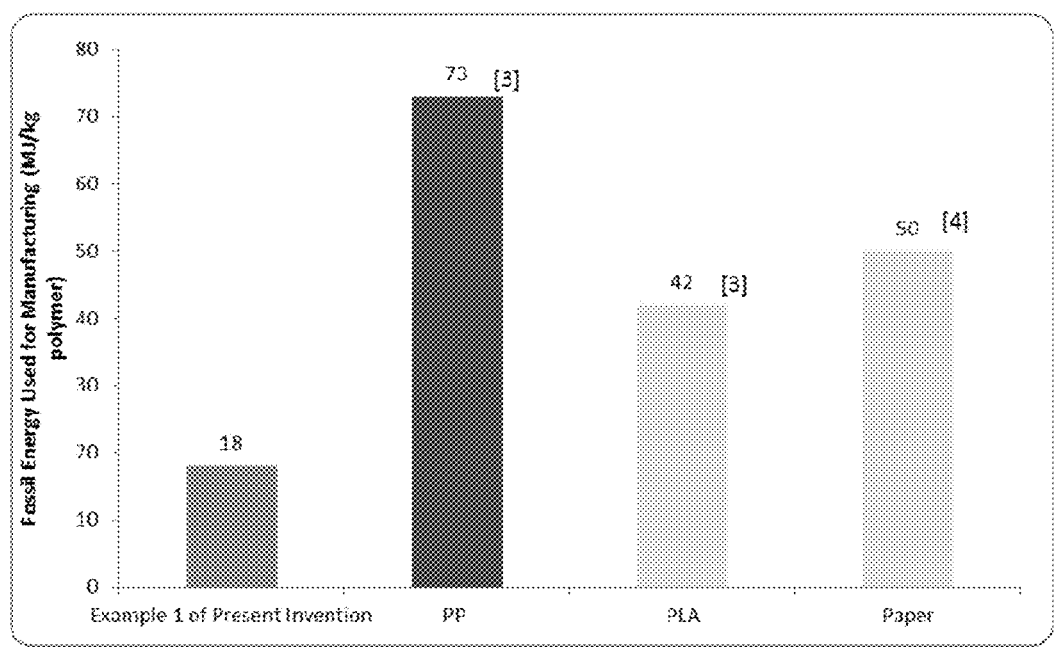
FIG. 2 is a graph showing calculated energy consumption of different produced TPS composition compared to the disclosed TPS composition.
Figure 3:
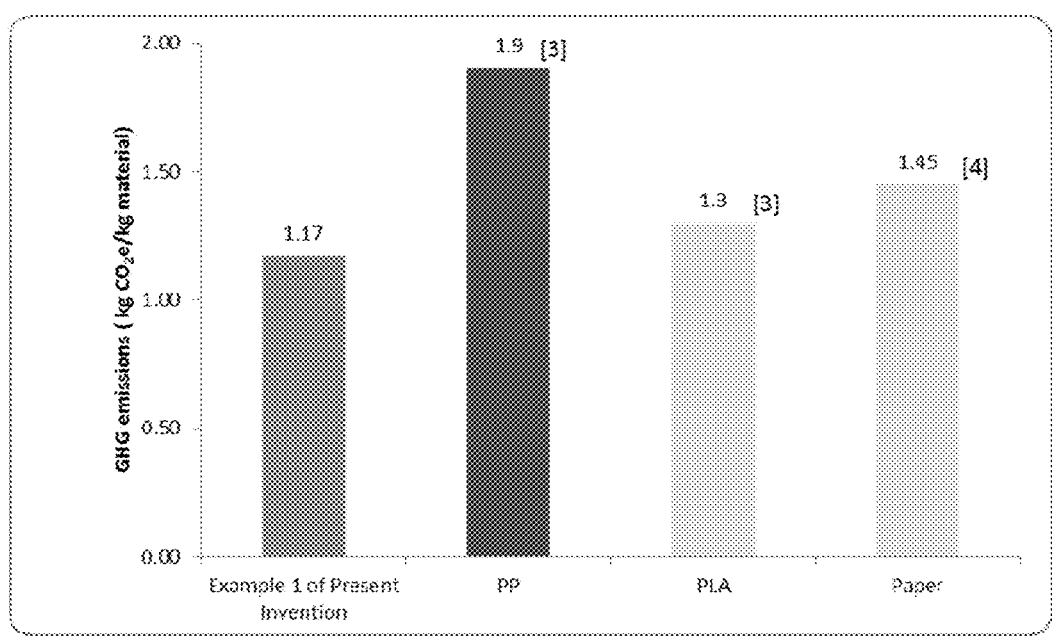
FIG. 3 is a graph showing calculated carbon footprint of the disclosed TPS composition compared to TPS compositions derived from other material.

Fossil energy used for the transportation of the starch residues from supplier followed by the processing of starch residues=1.00 MJ/kg Fossil energy used for the transportation of the recycle PP from supplier followed by the processing of the recycle plastics=36.20 MJ/kg Fossil energy used for the production and transportation of the Di-substituted glycerol from supplier=52.35 MJ/kg Fossil energy used for pre-mixing=0.22 MJ/kg Fossil energy used for reactive extrusion=3.38 MJ/kg Fossil energy for the manufacturing of Example 1=0.60 (1.00)+0.30 (36.2)+0.05 (52.35)+0.22+3.38=17.7 MJ/kg Carbon footprint used for the transportation of the starch residues from supplier followed by the processing of starch residues=0.16 kg $CO_2$e/kg Carbon footprint used for the transportation of the recycle PP from supplier followed by the processing of the recycle PP=1.14 kg $CO_2$e/kg Carbon footprint used for the production and transportation of the Di-substituted glycerol from supplier=1.96 kg $CO_2$e/kg Carbon foot print used for pre-mixing=0.04 kg $CO_2$e/kg Carbon foot print used for reactive extrusion=0.59 kg $CO_2$e/kg Carbon footprint for the manufacturing of Sample 1=0.6 (0.16)+0.30 (1.14)+0.05 (1.96)+0.04+0.59=1.17 kg $CO_2$e/kg The calculated fossil energy consumption and carbon footprint of sample 1 were used to compare with other materials. The comparison shows that the sample 1 of the disclosed composition is far more energy efficiency and significantly lower in carbon footprint. The details of the comparison are shown in FIG. 2 and FIG. 3.

Changes therein and other uses will occur to those skilled in the art which are encompassed within the scope of the invention as defined by the scope of the claims.

REFERENCE

[1] Specification for the assessment of the life cycle greenhouse gas emissions of goods and services, PAS 2050: 2011, [Online: www.bsigroup.com/upload/Standards %20 . . . /Energy/PAS2050.pdf], Publicly available

REFERENCES

[2] M. F. Ashby, *Material Profiles*, Materials and the environment: eco-informed material choice, 2009, p 297-299.

[3] E. T. H. Vink, S. Davies and J. J. Kolstad, *The eco-profile for current Ingeo® polylactide production*, Industrial Biotechnology, 2010 (6), p 213-225 [Online]. Available from NatureWorks website www.naturewoksllc.com, 4. J. Laurijssen, M. Marsidi, A. Westenbroek, E. Worrell, A. Faaij, *Paper and biomass for energy? Me impact of paper recycling on energy and $CO_2$ emissions*, Resources, Conservation and Recycling, 2010 (54), p 1208-1218.

The invention claimed is:

1. A method of forming a bio-resin product, the method comprising:
   forming a first blend comprising an agricultural byproduct having a starch content of less than 50% by dry weight;
   forming a second blend by combining a synthetic polymer, initiator, and a coupling agent;
   compounding the first blend and the second blend, the compounding including combining the first blend and second blend in an extruder and coextruding the combined first blend and second blend to form a bio-resin; and
   forming a product from the bio-resin.

2. A method, comprising: forming a bio-resin, said forming comprising:
   forming a first blend comprising an agricultural byproduct having a starch content of less than 50% by dry weight;
   forming a second blend by combining a synthetic polymer, initiator, and a coupling agent; and
   compounding the first blend and the second blend to form a bio-resin.

3. The method of claim 2, wherein the compounding includes combining and coextruding the first blend and second blend.

4. The method of claim 2, wherein the compounding includes combining the first blend and the second blend in an extruder and extruding the bio-resin from the extruder.

5. The method of claim 2, wherein the compounding includes combining the first blend and the second blend in a twin-screw extruder and extruding the bio-resin from the twin-screw extruder.

6. The method of claim 2, wherein the compounding includes combining the first blend and the second blend in an extruder and extruding the bio-resin from the extruder, the extruder having a length to diameter ratio from 30 to 60.

7. The method of claim 2, wherein the compounding is done at a temperature of 140° C. or higher.

8. The method of claim 2, wherein forming the first blend includes combining a filler material with the agricultural byproduct having a starch content less than 50% dry weight.

9. The method of claim 2, wherein forming the first blend includes combining a natural filler material with the agricultural byproduct having a starch content of less than 50% by dry weight.

10. The method of claim 2, wherein forming the first blend includes combining a pulverized powder natural filler material with the agricultural byproduct having a starch content of less than 50% by dry weight.

11. The method of claim 2, wherein forming the first blend includes combining a natural filler material having an average particle size of 170 microns or less with the agricultural byproduct having a starch content of less than 50% by dry weight.

12. The method of claim 2, wherein a content of amylose in the agricultural byproduct is less than 20% by dry weight.

13. The method of claim 2, further comprising: forming a product from the bio-resin.

14. The method of claim 2, further comprising: sheet-extruding the bio-resin to form a product.

15. The method of claim 2, wherein the initiator is in 0.01 to 5% by weight of total composition.

16. The method of claim 2, wherein the initiator is selected from the group consisting of sodium peroxide, tert-butyl hydroperoxide, di-tert-butyl peroxide, dicumyl peroxide, and a combination thereof.

* * * * *